(No Model.)  2 Sheets—Sheet 1.
A. W. BROWNE.
DENTAL CHAIR.
No. 519,758.  Patented May 15, 1894.
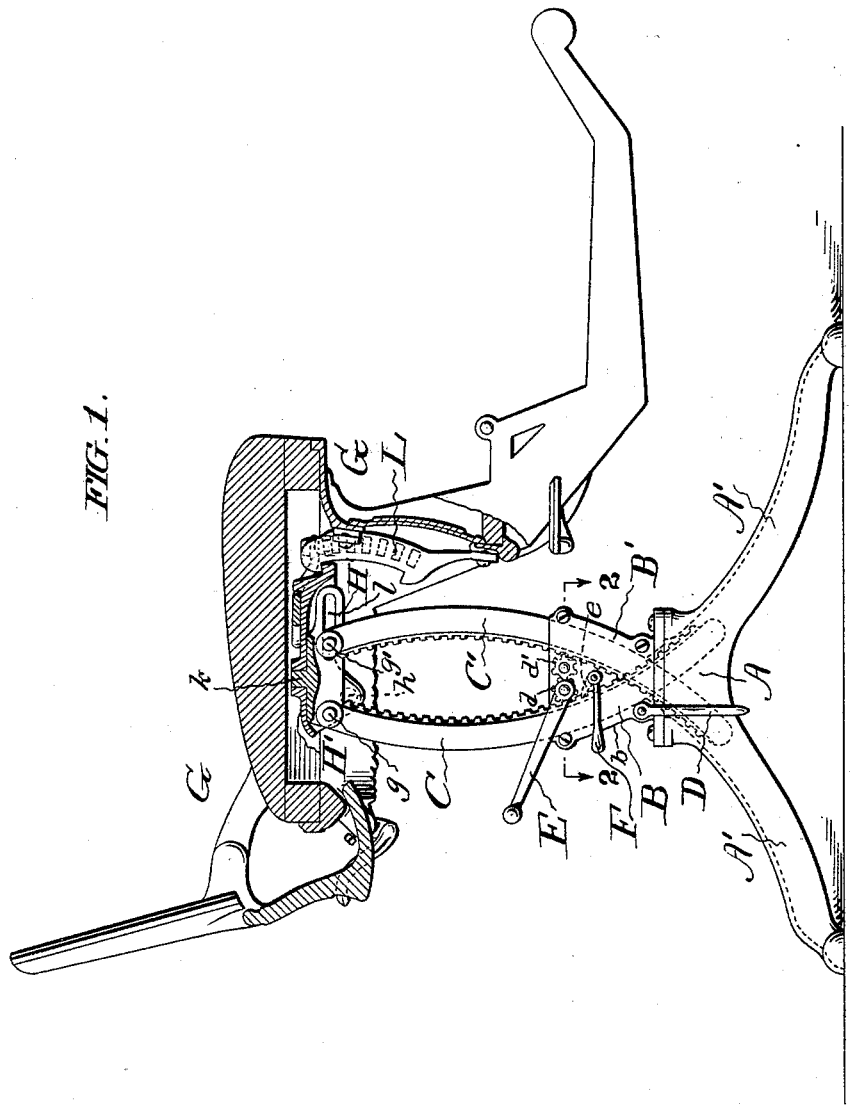
WITNESSES:  INVENTOR (No Model.) 2 Sheets—Sheet 2.
A. W. BROWNE.
DENTAL CHAIR.
No. 519,758. Patented May 15, 1894.
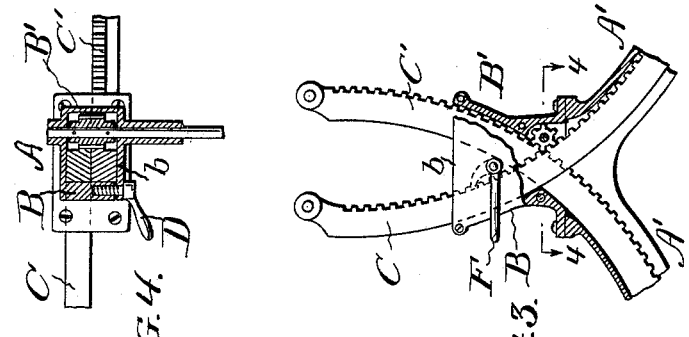
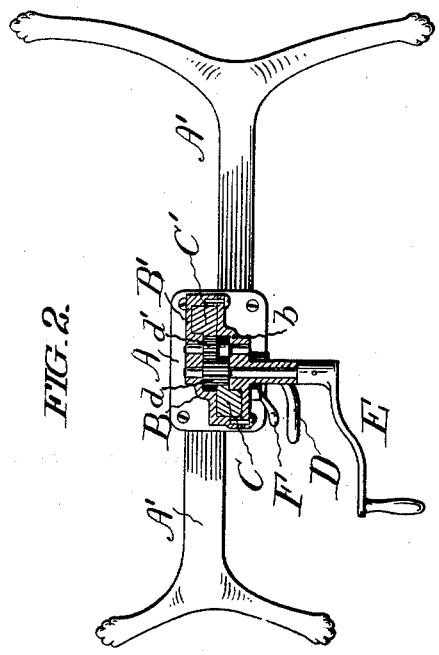
WITNESSES:    INVENTOR

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

DENTAL CHAIR.

SPECIFICATION forming part of Letters Patent No. 519,758, dated May 15, 1894.

Application filed February 6, 1894. Serial No. 499,282. (No model.)

*To all whom it may concern:*

Be it known that I, ARTHUR W. BROWNE, a citizen of the United States, residing at Prince's Bay, in the county of Richmond and State of New York, have invented certain new and useful Improvements in Dental Chairs; and I do hereby declare the following to be a full, clear, and exact description of the invention, such as will enable others skilled in the art to which it appertains to make and use the same.

My invention relates to certain improvements, as hereinafter claimed, in means for supporting and vertically adjusting the bodies of dental chairs.

In my application filed February 5, 1894, Serial No. 499,052, features are shown resembling in some respects mechanism employed in connection with my present invention; and I do not herein claim any improvements set forth in said application.

In the accompanying drawings which show a suitable embodiment of my improvements, Figure 1 is a view partly in side elevation and partly in vertical section, with some parts of the chair—illustration of which is not needed—omitted. Fig. 2 is a view partly in plan and partly in section on the line 2 of Fig. 1. Fig. 3 is a view partly in side elevation and partly in vertical section representing a modification, various parts being omitted; and Fig. 4 is a section on the line 4 of Fig. 3.

A base or pedestal A is provided with curved guide-ways or carriers B B' for correspondingly curved vertically adjustable rack bars C C' which cross each other in their carriers and slide in the hollow legs A' A' of the pedestal. The rack teeth are on the inner surfaces of the rack bars, facing or projecting toward each other above the point of crossing of the bars. A side plate *b* of the casing constituting the carriers for the rack bars forms a detachable and adjustable portion of the carriers screwed or bolted in place. A clamp screw actuated by a lever D serves to force the side plate inward to firmly clamp the rack bars against lateral or vibratory movement in their carrier after vertical adjustment of these bars.

The rack bars are actuated, to either raise or lower them, by means as follows:—Pinions *d d'* meshing with each other engage the one with the teeth of the rack bar C, and the other with the teeth of the rack bar C'. These pinions are mounted within the carrier casing upon shafts having suitable bearing in said casing, and to one of the pinion shafts is attached a crank E by which to actuate them. A pawl *e* within the carrier casing is secured to a rock shaft having bearings in this casing, and a crank F secured to this rock shaft serves to actuate the pawl which is adapted to be engaged with the teeth of one of the rack bars to uphold it, and may be tripped to allow of descent of the rack bars. A chair body G has jointed supporting connection with the upper ends of the rack bars in the following way: The bars are jointed to a support H for a chair body carrier H' provided with trunnions or journals to which the chair body is pivoted so that it may be tilted vertically in well known way. In Fig. 1 one of the trunnions *h* of the chair body carrier is shown as dotted in position. The chair body carrier is adapted to turn horizontally about a vertical trunnion or journal *k* of its support, and suitable well known means may be employed to clamp the carrier against movement about this journal. The upper ends of the rack bars are jointed the one in advance of the other to the support H by pivots at *g g'*. As the distance between the upper ends of the rack bars varies during their vertical adjustment, provision is made for the horizontal or sliding movement of one of these bars at its jointed connection with the support. In this instance the pivot *g'* is adapted to slide in slots *l* (one only of which is shown) in flanges of the support. Suitable well known detent devices, such as the notched detent plate L secured to the chair body and a lever mounted on the chair body carrier, are employed to lock the chair body in the position to which it may be tilted about its carrier trunnions.

In the modification represented by Figs. 3 and 4, a single pinion engaging both rack bars at their point of crossing serves to actuate them.

From the above description the operation of my improvements will readily be understood, and it will be seen that a wide range of vertical adjustment may be imparted to the chair body.

I claim as my invention—

The combination of the vertically adjustable curved rack bars crossing each other and projecting upwardly above the point of crossing the one in advance of the other, the base or pedestal in which the rack bars slide, gearing for actuating the rack bars to raise and lower them, and the chair body support to which the bars are pivoted at their upper ends, the one in advance of the other, with the pivot at the upper end of one of said bars having sliding connection with said support, substantially as set forth.

In testimony whereof I affix my signature in presence of two witnesses.

ARTHUR W. BROWNE.

Witnesses:
ELI T. STARR,
EDW. F. SIMPSON, Jr.